Dec. 15, 1959 — C. H. HOLSCLAW — 2,916,916
WELL TESTING APPARATUS
Filed Dec. 20, 1956 — 2 Sheets-Sheet 1

INVENTOR
CHARLES H. HOLSCLAW
by: Carlson, Pitzner, Hubbard & Wolfe
ATTYS.

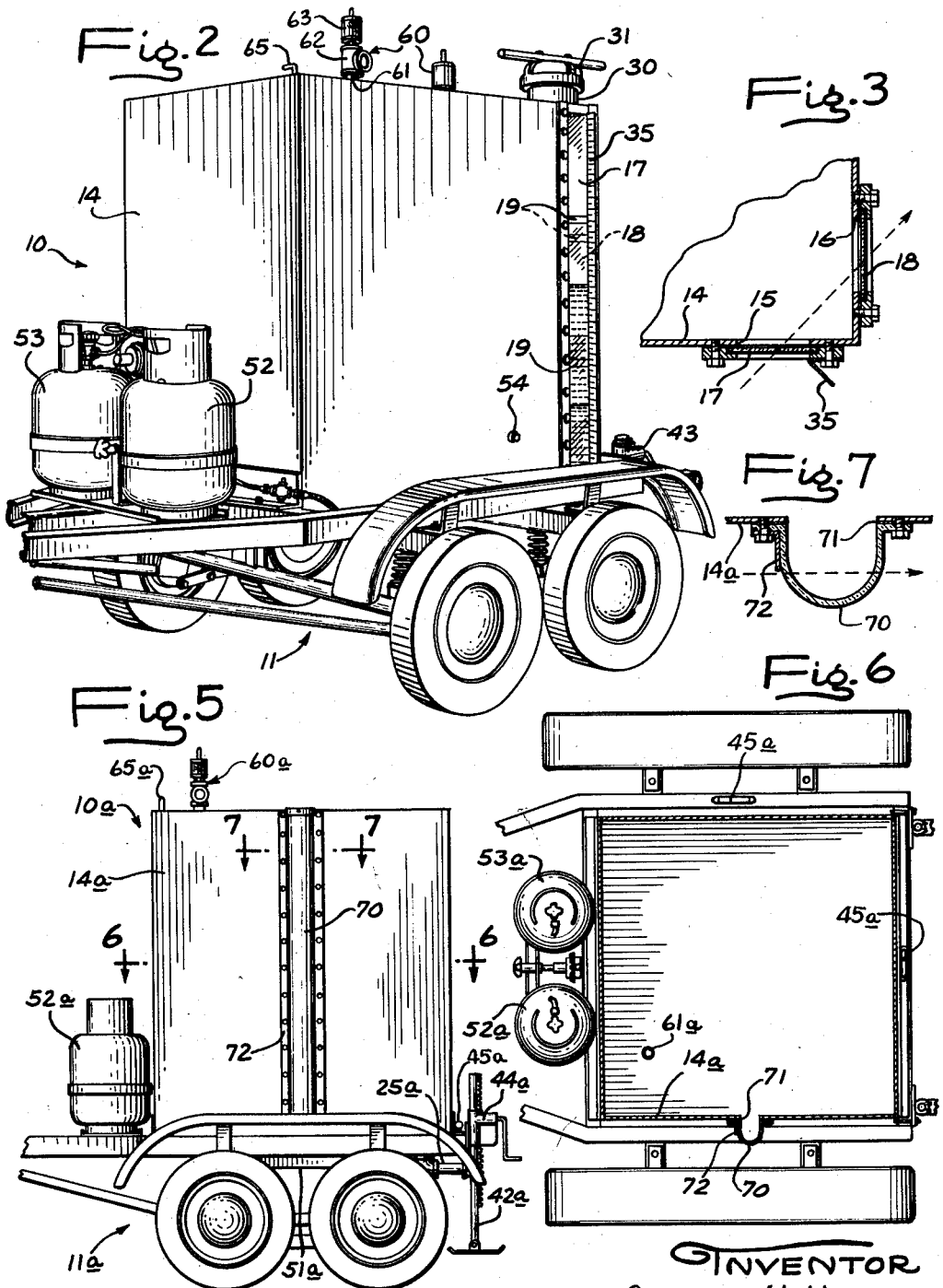

United States Patent Office 2,916,916
Patented Dec. 15, 1959

2,916,916

WELL TESTING APPARATUS

Charles H. Holsclaw, Evansville, Ind.

Application December 20, 1956, Serial No. 629,610

3 Claims. (Cl. 73—427)

This invention relates generally to oil well testing devices and, more particularly, to a mobile apparatus for determining the rate of oil well flow and the relative percentages of crude oil and water in that flow.

In an effort to satisfy the ever-increasing demand for crude oil and the many products derived from it, oil producers have been turning in recent years to the expedient of "water flooding" in an effort to recover as much crude oil as possible from known deposits. This practice, while becoming more and more widespread, has always presented difficult problems of control, largely because it has not been possible to economically obtain information required to indicate the progress of the operation.

Briefly, the theory of water flooding is that when a fluid such as water, which will not mix with oil, is forced into an oil containing, pervious, geological structure, the water will wash through the permeable formation and force the remaining oil before it, thus sweeping the oil from the formation for pumping out of the wells dug into the structure.

In practice, when it is desired to water flood a particular formation or geological structure, certain wells in the pattern of wells that have been extended into the structure are selected and water, under considerable pressure, is forced through them and into the formation. Upon entering the formation, the water spreads out, sweeping the oil before it, so that it may be pumped from the remaining producing wells. Since the distances between the producing wells and the water introducing wells may vary, and, since the permeability of the formation may not be uniform, the advancing water front will "break through" to the producing wells at different times, and thus different ones of the producing wells will begin pumping a mixture of oil and water as breakthrough occurs. However, it has been shown that a significant amount of recoverable petroleum remains after the water breakthrough, depending upon a factor referred to as "sweep out" efficiency, and, therefore, flooding is continued until the operation becomes uneconomical at each of the producing wells.

It will be apparent that in conducting a flooding operation, a frequent and accurate check must be made of the production from each of the producing wells to both determine the relative amounts of oil and water being obtained and gage the well's rate of production. Heretofore, elaborate testing equipment has been relied upon to provide this information, and often it has been of a semi-permanent nature requiring considerable time and expense to install. Then, too, this equipment has utilized instruments such as rate-of-flow indicators that are subject to errors introduced by the variable gas pressures which are encountered in oil well testing work, and thus the information obtained has not always been accurate.

It is the general aim of the invention to fill the need outlined above and provide a mobile well testing apparatus which can be easily transported to any producing well, which will allow an accurate, positive, direct reading of the relative amounts of oil and water being produced by the well, and which will, simultaneously, indicate the rate of well production. It is a related object to provide a device of the above character which is simple to use and which may be reliably employed by ordinary field personnel. It is still another object to provide a device which requires no auxiliary measuring or illuminating devices.

It is a further object to provide a well tester of the above character which will rapidly obtain the desired information and which can be immediately transported to the next well to repeat and continue the testing, one testing unit thus servicing an entire field.

In more detail, it is an object to provide a testing device of this type which is rugged and sturdy, and is thus suitable for use under the most difficult oil field conditions that may be encountered. It is a related object to provide a tester of this type that may be simply and economically maintained in effective working condition.

It is also an object to provide a mobile oil well testing unit that is inexpensive to manufacture and operate.

Other objects and advantages of the invention will become apparent upon reading the attached detailed description and upon reference to the drawings in which:

Fig. 2 is a front perspective of the apparatus shown in Fig. 1.

Fig. 3 is a fragmentary section taken horizontally through the gage of the apparatus shown in Fig. 1.

Fig. 5 is a side elevation of a modified form of the invention.

Fig. 6 is a section taken along line 6—6 of Fig. 5.

Fig. 7 is an enlarged fragmentary section taken along the line 7—7 in Fig. 5.

While the invention will be described in connection with certain preferred embodiments, it will be understood that I do not intend to limit the invention to such embodiments but, on the contrary, intend to cover such other alternative embodiments and constructions as may be included within the spirit and scope of the appended claims.

Figure 1:
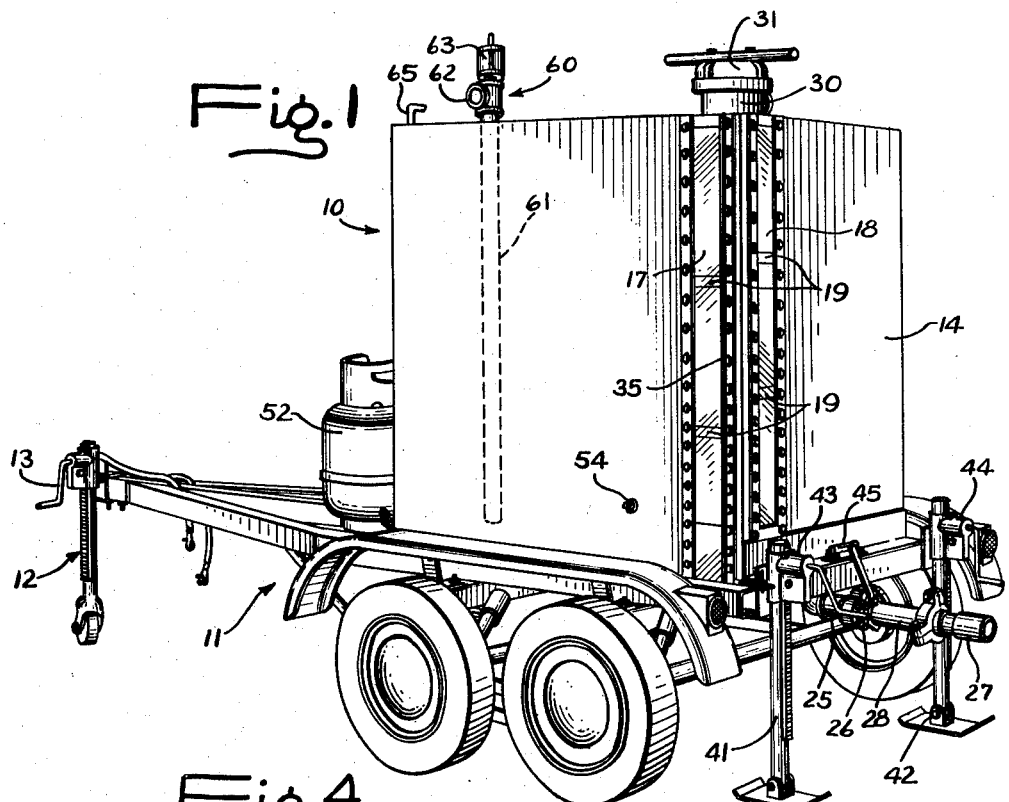
Figure 1 is a rear perspective view of a mobile well testing apparatus constructed according to the present invention.

Turning first to Fig. 1, there is shown a tester unit 10 constructed according to the present invention mounted on a wheeled chassis or frame 11. The chassis 11 may be of any convenient type and in the present embodiment comprises a four-wheel tandem trailer designed to be hitched at the rear of a truck or other vehicle. To support the chassis when it is not hitched to a conveying vehicle, a wheel assembly 12 is provided at the forward end of the chassis frame which may be lowered into contact with the ground by adjusting the crank 13.

In accordance with the present invention, the tester 10 comprises a tank with provision for fluid inlet and outlet, having means for supporting the same level with the ground, and with a pair of transparent panels integral with and forming a continuation of the side wall structure of the tank permitting line of sight viewing of the body of liquid within the tank through both of the panels together with a scale for indicating the height of the component liquids.

In the preferred embodiment the tester comprises a generally cubicle tank 14 mounted rigidly on the chassis 11 and having two vertical slots 15, 16 formed in adjacent sides of the tank and at one corner thereof (see Fig. 3). Each of the slots 15, 16 is covered by transparent panels 17 and 18 respectively which may be composed of glass or a suitable transparent plastic such as Plexiglas. The transparent panels 17 and 18 are suitably sealed at the opposite edges of the slots 15 and 16 so that the tank 14 and the transparent panels form a liquid-tight enclosure.

Preferably each slot 15, 16 is made in sections which are separated by portions of the side walls forming integral straps 19 which serve to rigidify and strengthen the corner of the tank 14 at which the slots are formed.

In order to determine the volume of the liquids contained by the tank 14, a graduated scale 35 is provided which is attached at the side of transparent panel 17 and angled outwardly from the tank, as shown in Fig. 3. The graduations on scale 35 are adjacent and closely disposed to the transparent panel 17 so that any level of liquid contained by the tank 14 can be easily associated with a graduated mark on the scale, as can be seen in Fig. 2, and the graduations are calibrated so that when the tank is horizontal the scale will indicate the volume of liquid contained by tank 14 for any liquid level appearing at the panel 17.

So that the liquid levels are clearly visible in the transparent gage panel 17, the second panel 18 is positioned so as to afford a straight line of sight adjacent the outwardly angled graduated scale 35 and through the tank 14, as indicated by the arrow in Fig. 3. In normal day-time use, the top liquid level of the fluid and the interface between the crude oil and the water are clearly visible since it is possible to see completely through a corner of the tank 14 and light through both transparent panels 17 and 18 illuminates the contents of the tank. At night it has been found that the gage can be accurately and conveniently read by allowing a light, such as a flash light or the head lamps of a vehicle to shine through the panel 18 and thus clearly define the liquid levels to an observer at panel 17.

Figure 4:
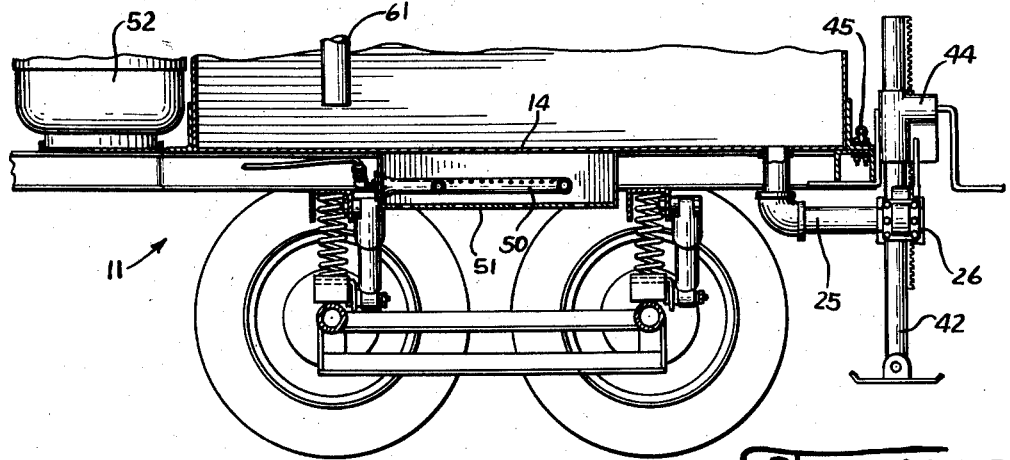
Fig. 4 is a fragmentary vertical section showing the heating unit beneath the apparatus of Fig. 1.

For the purpose of introducing and discharging liquid to and from the tank 14, a pipe assembly 25 opens into the bottom of tank 14 and extends rearwardly to end in a suitable pipe coupling device 26 (see Figs. 1 and 4). When it is desired to introduce fluid into the tank, a flexible hose 27 can be extended from the source of fluid supply, such as an oil well, and an attached nozzle 28 may be fitted into the coupling device 26 so as to form a continuous fluid-conducting passage from the well to the interior of tank 14. Alternatively, access to the interior of tank 14 can be obtained through a short, relatively wide cylindrical pipe section 30 which provides an opening through the top of tank 14. To close this opening when not in use, a cap 31 is threaded onto the open top of cylinder 30.

To hold the tank in a horizontal leveled position so that the scale 35 can accurately indicate the liquid volumes contained by the tank 14, suitable leveling means for the tester 10 are provided. In the present embodiment, the leveling means takes the form of two adjustable jacks 41, 42 mounted at the rear of the chassis 11. These jacks may be lowered and held in adjusted position by selectively manipulating the cranks 43, 44. Cooperating with the jacks 41, 42 is the adjustably mounted front wheel 12, and by suitably positioning wheel 12 and jacks 41, 42, the tester 10 may be tilted with respect to the ground on which it stands and thus brought into horizontal level position. To aid in leveling the tester 10, suitable spirit levels 45 may be disposed along alternate axes of the tester.

One of the features of the invention is the provision of heating means to bring the contents of tank 14 up to a desired temperature. It has been found that a water and crude oil fluid mixture will not readily separate into oil and water layers when cold. Therefore, during winter operations it is highly desirable to heat the oil and water mixture in tank 14 so that accurate and quick measurements can be obtained. In the present embodiment, the heating means comprises a burner unit 50 mounted beneath tank 14 and within a perforated enclosure 51 (see Fig. 4). Fuel for burner 50 is supplied by two propane tanks 52, 53, mounted on chassis 11 at the front of tank 14. Suitable conduits are provided between the propane tanks 52, 53 and the burner 50 to permit fuel to steadily flow from the tanks for ignition at burner 50 to heat the contents of tank 14. To check the temperature of the liquids, a fitting 54 is provided in one side wall of the tank to permit a thermometer to be inserted into the tank.

It is another feature of the invention to provide means for introducing into the tank 14 a suitable amount of a separation accelerating chemical while simultaneously agitating the tank contents to assure uniform dispersion of the chemical. It is well known that certain chemicals in fluid form, such as phenol, sodium oleate, sodium resinate and cresylic acid, are effective to accelerate the separation of crude oil and water in a fluid mixture and, therefore, the introduction of such a chemical to the tank 14 as it is filled with the production from a well to be tested will aid in producing a separation between the oil and water and thus expedite the testing procedure. To accomplish the introduction and uniform dispersion of a separation accelerating chemical, an alternative filler pipe assembly 60 is provided. In the preferred embodiment the assembly 60 comprises a filler pipe 61 passing through the top of the tank 14 and extending down into the tank to about six to eight inches from the floor or bottom of the tank. Carried at the top of the pipe 61 is a connection 62 permitting a flexible hose from the pump of the oil well to be tested to be coupled to the pipe 61 and thus provide a fluid path from the well to the tank 14. Mounted above, and opening into, the connection 62 is a conventional "drip oiler" 63 which may be filled with a suitable separation accelerating chemical and manually adjusted to drip the chemical at a predetermined rate into and through the pipe 61 to the tank 14.

It can be readily seen that when the crude oil and water mixture is introduced through the connection 62 to the pipe 61, and the drip oiler 63 is adjusted to introduce the liquid chemical at a steady rate of flow, the oil, water and chemical will become thoroughly mixed as they are pumped down the filler pipe 61 into the tank 14. Furthermore, it has been found that when the liquid level in tank 14 rises above the lower end of the filler pipe 61, the successive surges of crude oil from the oil well pump flowing through the filler pipe 61 causes pronounced continuous agitation of the tank contents by what may be termed a "burping" action. This action quickly and uniformly disperses the separation accelerating chemical through the productive flow from the oil well as the crude oil is added to the tank of the testing apparatus. It can thus be seen that a separation accelerating chemical can be added in any desired quantity and be automatically uniformly dispersed throughout the contents of the tank 14 as the tank is filled.

To permit air trapped in the tank 14 to escape during filling operations, an air vent or breather pipe 65 is provided. In the preferred embodiment the breather pipe 65 is a small, L-shaped tube passing through the top of tank 14. The L-shaped configuration of the pipe 65 prevents rain or other settling foreign particels from entering the tank 14.

In keeping with the invention, it can be seen that the cylindrical access opening 31 is positioned in the corner of tank 14 and directly above the two transparent panels 17 and 18 so that convenient access can be had to the interior of the panels whenever it becomes necessary to clean them after long periods of use.

In the embodiment described above the viewing panels are located at a corner of the tank and in adjacent walls thereof. However, the present invention is not limited thereto and if desired the two viewing panels may be made integral with one another as shown in Figs. 5, 6 and 7. In these figures, elements which are the same as those appearing in Figs. 1 to 4 are given the same numerical designation with the suffix "a" added. To view the interior of tank 14a, a transparent member 70 is mounted across a slot 71 formed in the side wall of tank 14a and bulges outwardly to take, in the disclosed embodiment, a semi-cylindrical form. To determine the volume of liquids contained in the tank 14a, a graduated scale 72 is fixed to the tank at one side of the member 70. It can be seen that due to the outward bulging, semi-cylindrical cross-section of member 70, a direct line of sight is afforded (see arrow in Fig. 7) past the graduated scale 72 and through the transparent member 70 with the same advantageous result discussed above in connection with the Figure 1 embodiment.

A feature characterizing each of the above embodiments is the arrangement of the viewing panels in proximity so that light for viewing is required to pass through the body of liquid only to the extent of a small fraction of the thickness of the total liquid column contained by the tank while permitting direct measurement of the liquid body. This is particularly advantageous where the liquid components are dark or cloudy, enabling transmission of sufficient light for accurate readings even with relatively dim light sources.

To briefly summarize the operation of tester 10, the productive flow of an oil well to be tested is allowed to empty into a closed container for a predetermined length of time. When the flow is cut off, the fluids are allowed to settle and the crude oil inherently rises or floats to the top of the fluid mixture while the water portion of the well's productive flow forms a bottom layer in the closed container. When the oil and water separate into distinct layers, two liquid levels appear. First there is the upper level of the fluid mixture which represents the total amount of fluid flowing from the well during the predetermined time interval. Second, there is in the interface between the oil and water which will indicate the total amount of water produced from the well during the predetermined time interval. The tester is provided with means for viewing a cross section of the liquid which it contains and is calibrated so that a given liquid level is associated with a certain predetermined volume. Therefore, by viewing the top level of the fluid mixture and the level of the interfaec between the oil and water, and by noting the volumes which these levels represent, it is a simple matter to determine the relative percentages of oil and water being produced by the oil well under test. Furthermore, since the volume of production for a predetermined time interval is known, it is a relatively simple matter to determine the rate of oil production in terms of barrels per hour or any other convenient unit.

I claim as my invention:

1. A mobile well testing apparatus for determining the relative proportions of oil and water being obtained from producing oil wells, comprising in combination, a tank having an access connection for admitting a fluid mixture of crude oil and water, a wheeled chassis supporting said tank, said chassis carrying adjustable means providing at least three spaced points of support for said tank for leveling the latter to an operating horizontal position, a pair of transparent panels forming a portion of the sides of said tank and extending substantially from top to bottom thereof, said panels being disposed so that one lies behind the other and spaced therefrom a distance which is small compared to the major horizontal dimensions of the tank so as to provide a line of sight through a thin vertical cross section of the liquid contained by the tank, and a graduated scale mounted on said tank adjacent said line of sight and being calibrated for visually indicating the volume of oil and water contained by the tank.

2. A mobile well testing apparatus for determining the relative proportions of oil and water being obtained from producing oil wells, comprising in combination, a tank having a side corner and an access connection for admitting a fluid mixture of crude oil and water, a wheeled chassis supporting said tank, said chassis carrying adjustable means providing at least three spaced points of support for said tank for leveling the latter to an operating horizontal position, a first transparent panel set in a side wall of said tank adjacent said corner and permitting a cross section of the tank contents extending substantially from top to bottom to be viewed, a graduated scale mounted on said tank adjacent said first panel and calibrated for visually indicating the volume of oil and water contained by the tank, a second transparent panel set in a side wall of the tank around said corner from the first panel so as to provide a line of sight adjacent said scale through a thin vertical cross section of the liquid contained by the tank from substantially top to bottom of the tank, and heating means carried by the chassis beneath said tank so that mixed oil and water contained therein can be heated to effect complete separation of the mixture and produce a clearly visible interface therebetween.

3. A mobile well testing apparatus for determining the relative proportions of oil and water being obtained from producing oil wells, comprising in combination, a tank having an access connection for admitting a fluid mixture of crude oil and water, a wheeled chassis supporting said tank, said chassis carrying adjustable means providing at least three spaced points of support for said tank for leveling the latter to an operating horizontal position, a pair of transparent panels forming a portion of the sides of said tank and extending substantially from top to bottom thereof, said panels being disposed so that one lies behind the other and spaced therefrom a distance which is small compared to the major horizontal dimensions of the tank so as to provide a line of sight through a thin vertical cross section of the liquid contained by the tank, a graduated scale mounted on said tank adjacent said line of sight and being calibrated for visually indicating the volume of oil and water contained by the tank, a capped access opening in the top of said tank over said pair of panels permitting the inner surfaces of said panels to be cleaned, and a drip device on said access connection for feeding discrete amounts of a separation accelerating chemical to the liquid entering the tank so that the chemical is agitated throughout the tank contents as the tank is filled for producing a clearly defined interface adjacent said scale.

References Cited in the file of this patent

UNITED STATES PATENTS

| | | |
|---|---|---|
| 1,273,103 | Sanders | July 16, 1918 |
| 1,566,948 | Wyatt | Dec. 22, 1925 |
| 2,031,230 | Seraphin | Feb. 18, 1936 |
| 2,049,068 | Loupe | July 28, 1936 |
| 2,326,144 | Johnston | Aug. 10, 1943 |
| 2,372,705 | Bicker | Apr. 3, 1945 |
| 2,526,192 | Battles et al. | Oct. 17, 1950 |
| 2,767,586 | Jancosek et al. | Oct. 23, 1956 |